US012409467B2

(12) United States Patent
Lee et al.

(10) Patent No.: US 12,409,467 B2
(45) **Date of Patent: *Sep. 9, 2025**

(54) CONTAINER FOR SPRAYING LIQUID

(71) Applicant: SAMHWA CO., LTD, Uiwang-si (KR)

(72) Inventors: Kyung Chang Lee, Uiwang-si (KR); Byung Jin Woo, Gunpo-si (KR); Geun Jang, Suwon-si (KR); Ki Sung Lee, Suwon-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 325 days.

This patent is subject to a terminal disclaimer.

(21) Appl. No.: 18/028,749

(22) PCT Filed: Dec. 18, 2020

(86) PCT No.: PCT/KR2020/018619
§ 371 (c)(1),
(2) Date: Mar. 27, 2023

(87) PCT Pub. No.: WO2022/075532
PCT Pub. Date: Apr. 14, 2022

(65) Prior Publication Data

US 2023/0330691 A1 Oct. 19, 2023

(30) Foreign Application Priority Data

Oct. 5, 2020 (KR) ........................ 10-2020-0128000

(51) Int. Cl.
*B05B 15/30* (2018.01)
*B05B 11/00* (2023.01)
(Continued)

(52) U.S. Cl.
CPC .......... *B05B 15/30* (2018.02); *B05B 11/0032* (2013.01); *B05B 11/0037* (2013.01);
(Continued)

(58) Field of Classification Search
CPC . B05B 15/30; B05B 11/1047; B05B 11/0037; B05B 11/1045
(Continued)

(56) References Cited

U.S. PATENT DOCUMENTS

| | | | | |
|---|---|---|---|---|
| 12,097,515 B2 * | 9/2024 | Lee | B05B 11/0038 | |
| 2006/0086759 A1 * | 4/2006 | Herzog | B05B 15/30 | 222/321.9 |

(Continued)

FOREIGN PATENT DOCUMENTS

| | | | | |
|---|---|---|---|---|
| FR | 2828480 A1 * | 2/2003 | B05B 11/0037 |
| JP | H09-048476 A | 2/1997 | |

(Continued)

OTHER PUBLICATIONS

International Search Report in International Application No. PCT/KR2020/018619, dated Jun. 25, 2021, 3 pages.

*Primary Examiner* — Paul R Durand
*Assistant Examiner* — Michael C Patterson
(74) *Attorney, Agent, or Firm* — Park, Kim & Suh, LLC

(57) ABSTRACT

A container for spraying liquid includes a body, a body cover, a pump, a pump support, and a shoulder. The body includes a filling space and a body outflow channel which has a smaller cross-sectional area compared to the filling space due to a partition. A content injected into the filling space enters the body outflow channel at a lower portion of the partition, and an upper body hole is formed at an upper portion of the partition as an exit from the body outflow channel. The body cover is coupled to an upper portion of the body and includes a cover channel communicating with the upper body hole and a pump insertion space communicating with the cover channel. The pump is inserted in the pump insertion space, and the pump support is coupled to an upper portion of the body cover to support the pump. The
(Continued)

100 shoulder is coupled to an upper portion of the pump support to press the pump support downward.

9 Claims, 14 Drawing Sheets

(51) Int. Cl.
*B05B 11/10* (2023.01)
*B65D 1/02* (2006.01)

(52) U.S. Cl.
CPC ...... *B05B 11/0044* (2018.08); *B05B 11/1001* (2023.01); *B05B 11/1023* (2023.01); *B05B 11/1047* (2023.01); *B65D 1/02* (2013.01); *B65D 1/0223* (2013.01)

(58) Field of Classification Search
USPC ........................................................ 222/400.8
See application file for complete search history.

(56) References Cited

U.S. PATENT DOCUMENTS

| | | | | |
|---|---|---|---|---|
| 2011/0036927 | A1* | 2/2011 | Hensen | B05B 15/652 239/302 |
| 2012/0234872 | A1* | 9/2012 | Good | B05B 11/1047 222/464.1 |
| 2015/0217314 | A1* | 8/2015 | Kharbanda | B05B 15/30 222/394 |

FOREIGN PATENT DOCUMENTS

| | | | |
|---|---|---|---|
| JP | 2002-000703 | A | 1/2002 |
| KR | 10-1324110 | B1 | 11/2013 |
| KR | 10-1963619 | B1 | 3/2019 |
| WO | 97/11025 | A1 | 3/1997 |

* cited by examiner

CONTAINER FOR SPRAYING LIQUID

CROSS-REFERENCE TO RELATED APPLICATIONS

This application is a National Phase Application of PCT International Application No. PCT/KR2020/018619, which was filed on Dec. 18, 2020, and which claims priority from Korean Patent Application No. 10-2020-0128000 filed on Oct. 5, 2020. The disclosures of the above patent applications are incorporated herein by reference in their entirety.

TECHNICAL FIELD

The present invention relates to a container for spraying liquid that has an improved channel structure for discharging the content.

BACKGROUND ART

In a cosmetic container, etc., that holds a liquid content such as a perfume and the like, a pump may be coupled to an upper opening of the container to dispense a fixed amount of content to the exterior. A user who wishes to dispense a liquid content may press down on a nozzle corresponding to a button, upon which the content that was previously drawn into the pump may be pressurized, moved up along the discharge path, and subsequently sprayed through the nozzle. When the user removes the pressure on the nozzle, the discharge path may be mechanically closed by the rising of the nozzle, causing a decrease in pressure inside the pump, and the content may again be drawn from the container to compensate for the pressure decrease.

Such a pump is being used for spraying a variety of contents, including not only perfumes and cosmetics but also air fresheners, insecticides, and others. In particular, the pump is growing in demand due to its convenient use, as a fixed amount of content can be dispensed by a single pressing of the nozzle, and the content is prevented from leaking to the outside. Typical structures of a conventional pump as well as a container having a coupled pump can be found in documents such as Korean Registered Patent No. 1963619.

Generally, in order to dispense a content from a body holding the content, a pump may be connected to a long hose, with the lower end of the hose touching the bottom surface of the body. The suctioning force of the pump may be applied on the inside of the hose, allowing the content held in the body to be drawn in through the hose and into the pump. While such a hose makes it possible to completely use up the content held in the body, the hose is inserted into the interior of the body and may be visible from the outside, whereby the overall aesthetic of the body may be lowered. The issue of lowered aesthetic may be especially problematic when the body corresponds to a cosmetic container. In such cases, the container equipped with a pump may often have the body fabricated from an opaque material, in order that the hose may not be seen from the outside.

DISCLOSURE

Technical Problem

An aspect of the present invention, which was conceived to resolve the problem described above, is to provide a container for spraying liquid that has an improved channel structure for discharging a content and thus may be used with the hose omitted.

Other objectives of the present invention will be more clearly understood from the embodiments set forth below.

Technical Solution

A container for spraying liquid according to one aspect of the invention includes: a body that includes a filling space and a body outflow channel, which has a smaller cross-sectional area compared to the filling space due to a partition provided along a lengthwise direction on one side, where a content injected into the filling space enters the body outflow channel at a lower portion of the partition, and an upper body hole is formed at an upper portion of the partition as an exit from the body outflow channel; a body cover that is coupled to an upper portion of the body and includes a cover channel and a pump insertion space, where the cover channel communicates with the upper body hole, and the pump insertion space communicates with the cover channel and is configured to receive a pump inserted therein; a pump support that is coupled to an upper portion of the body cover and is configured to support the pump; and a shoulder that is coupled to an upper portion of the pump support and is configured to press the pump support and the pump downward in a direction towards the body.

A container for spraying liquid according to an embodiment of the present invention can include one or more of the following features. For example, the body can have a cross section of a quadrilateral shape. A weight can be inserted inside the body outflow channel to reduce the cross-sectional area of the body outflow channel.

A coupling plane, in which the upper body hole is formed, can be provided at an upper portion of the body; a center hole that is configured to receive the pump insertion space inserted therein can be formed in the coupling plane; and a body protrusion can be formed on one side of the center hole such that the upper body hole is positioned on the inside of the body protrusion.

The body cover can include a channel protrusion that is inserted to the inside of the body protrusion and is in communication with the cover channel.

The pump support can include a contact protrusion that is configured to tightly contact the periphery of the pump.

The shoulder can include a detent protrusion that is configured to press the pump downwards; a shoulder air hole can be formed in the detent protrusion; a support air groove communicating with the shoulder air hole can be formed in the pump support; an air nozzle communicating with the support air groove can be formed in the body; and the air nozzle can be in communication with the filling space.

The body cover can include an air inflow hole into which the air nozzle may be inserted. A base can be coupled to a lower portion of the body. Also, the base can be formed together with the weight as an integrated structure.

Advantageous Effects

An embodiment of the present invention having the features above can provide various advantageous effects including the following. However, an embodiment of the present invention may not necessarily exhibit all of the effects below.

An embodiment of the present invention can provide a container from which a hose for discharging the content can be omitted.

MODE FOR INVENTION

Figure 1:
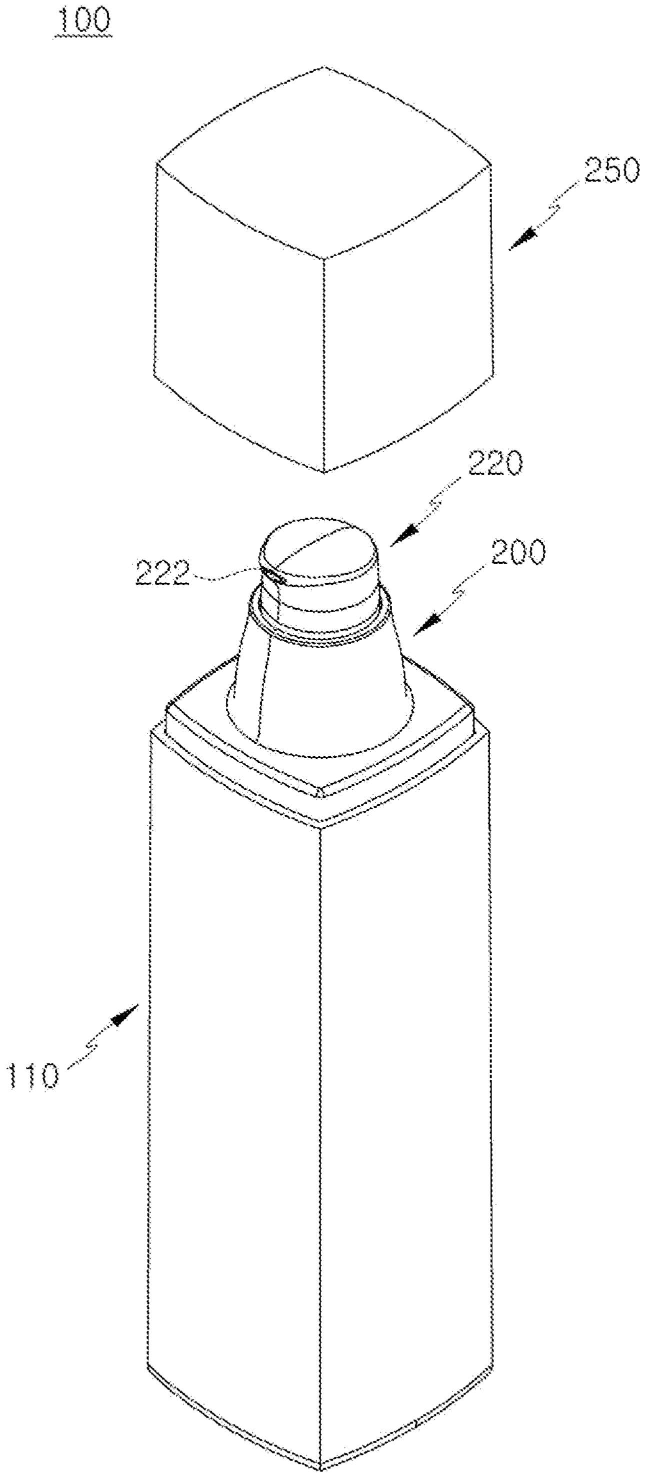
FIG. 1 is a perspective view of a container for spraying liquid according to a first disclosed embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

A container for spraying liquid according to this embodiment can be used to spray any of a variety of liquids, including cosmetics, perfumes, shampoos, detergents, sanitizers, and drugs, and is not limited by the type or property of the content being sprayed.

Figure 2:
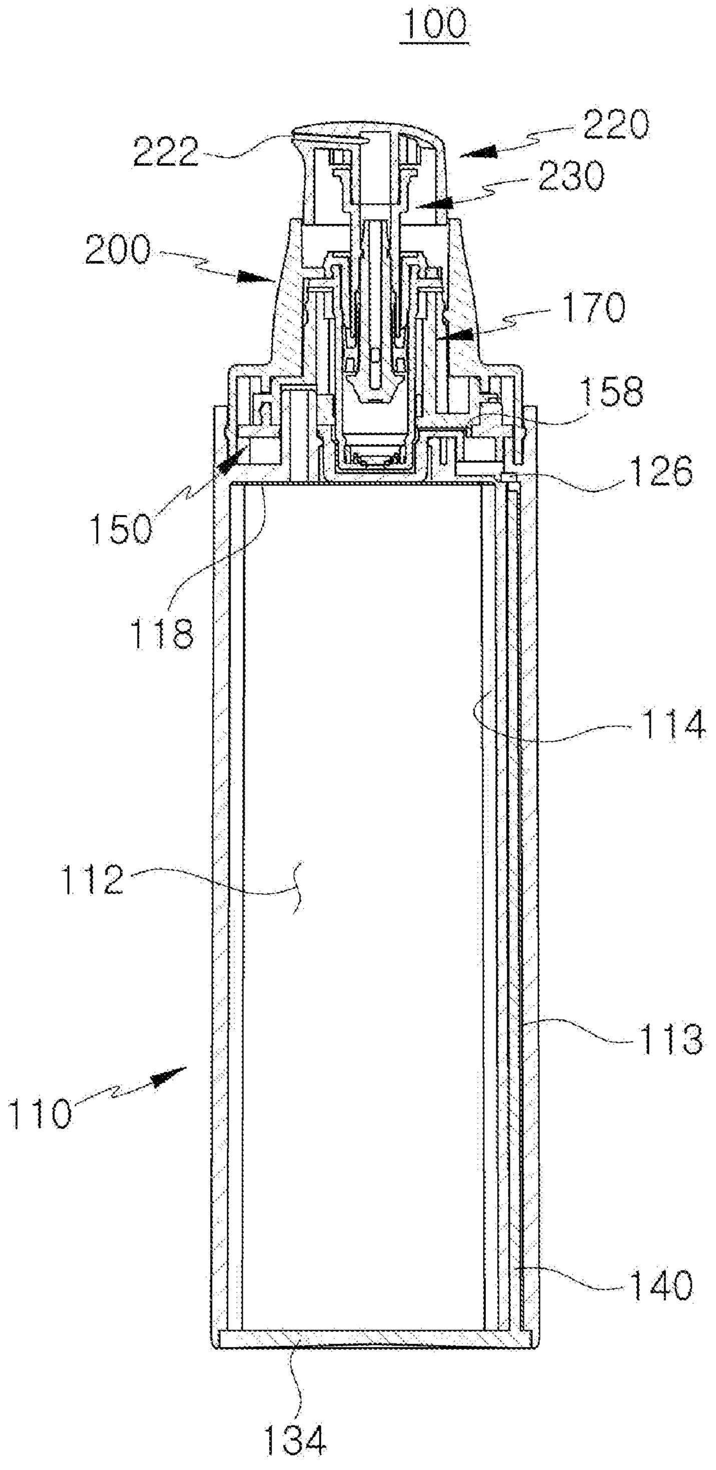
FIG. 2 is a central vertical cross-sectional view of the container for spraying liquid illustrated in FIG. 1.
Figure 3:
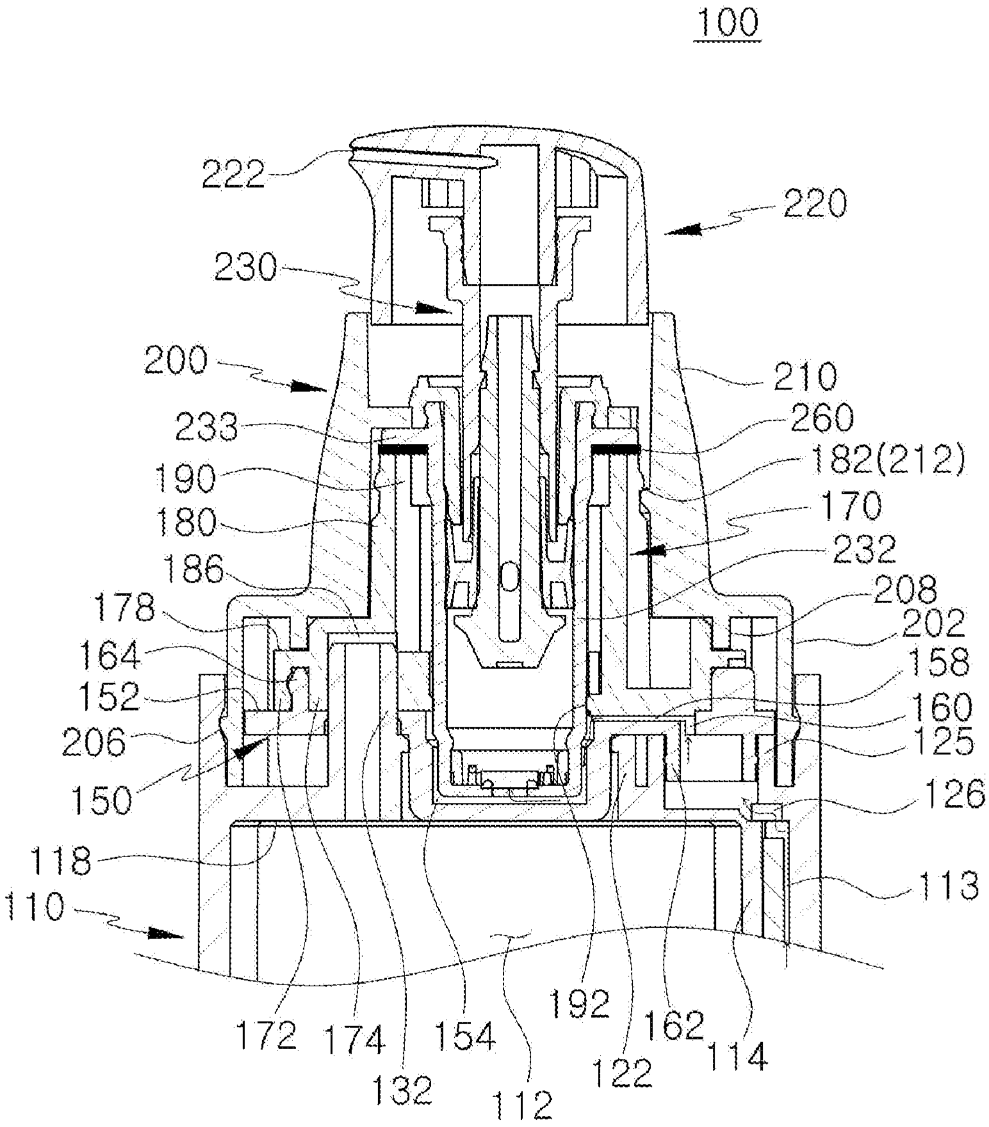
FIG. 3 is a magnified cross-sectional view of the upper part of the container for spraying liquid shown in FIG. 2.

FIG. 1 is a perspective view of a container 100 for spraying liquid according to a first disclosed embodiment of the invention. FIG. 2 is a central vertical cross-sectional view of the container 100, and FIG. 3 is a cross-sectional view with the upper part of the container 100 magnified. The arrows marked in FIG. 3 illustrate the discharge flow of the content.

Referring to FIGS. 1 to 3, a container 100 based on this embodiment is characterized in that the hose is omitted in the filling space 112 of the body 110 storing the content (not shown) and that a channel through which the content is discharged is formed by a partition 114, etc., at one side of the body 110. As a result, a container 100 based on this embodiment can have a simplified structure, and even if the body 110 is made from a transparent material, the container can have an improved aesthetic, as the hose is not visible inside the body 110.

A container 100 based on this embodiment may include a body 110, a body cover 150, a pump support 170, a shoulder 200, a nozzle cap 220, a pump 230, and an upper cap 250.

The upper cap 250 can be shaped as a hollow quadrilateral prism and can be structured to have an open bottom. The upper cap 250 may be coupled to a periphery of the shoulder 200 to cover the nozzle cap 220.

The nozzle cap 220 may be inserted inside the shoulder 200, and a nozzle 222 provided therein may be inserted in and coupled to the valve 234 of the pump 230. The valve 234 may be elastically supported by a spring (not shown), so that, when an external force is removed, the nozzle cap 220 can also be moved upward by the elastic force. A content that has passed through the valve 234 of the pump 230 can be discharged through the nozzle 222 to the exterior of the container 100.

A lower portion of the pump 230 may be inserted in a pump insertion space 154 formed in the body cover 150 and may be secured in place as the housing 232 is pressed downward by a detent protrusion 214 of the shoulder 200. The pump 230 can draw the content into the pump insertion space 154 and can suction the drawn content to discharge the content through the nozzle 222.

Figure 4:
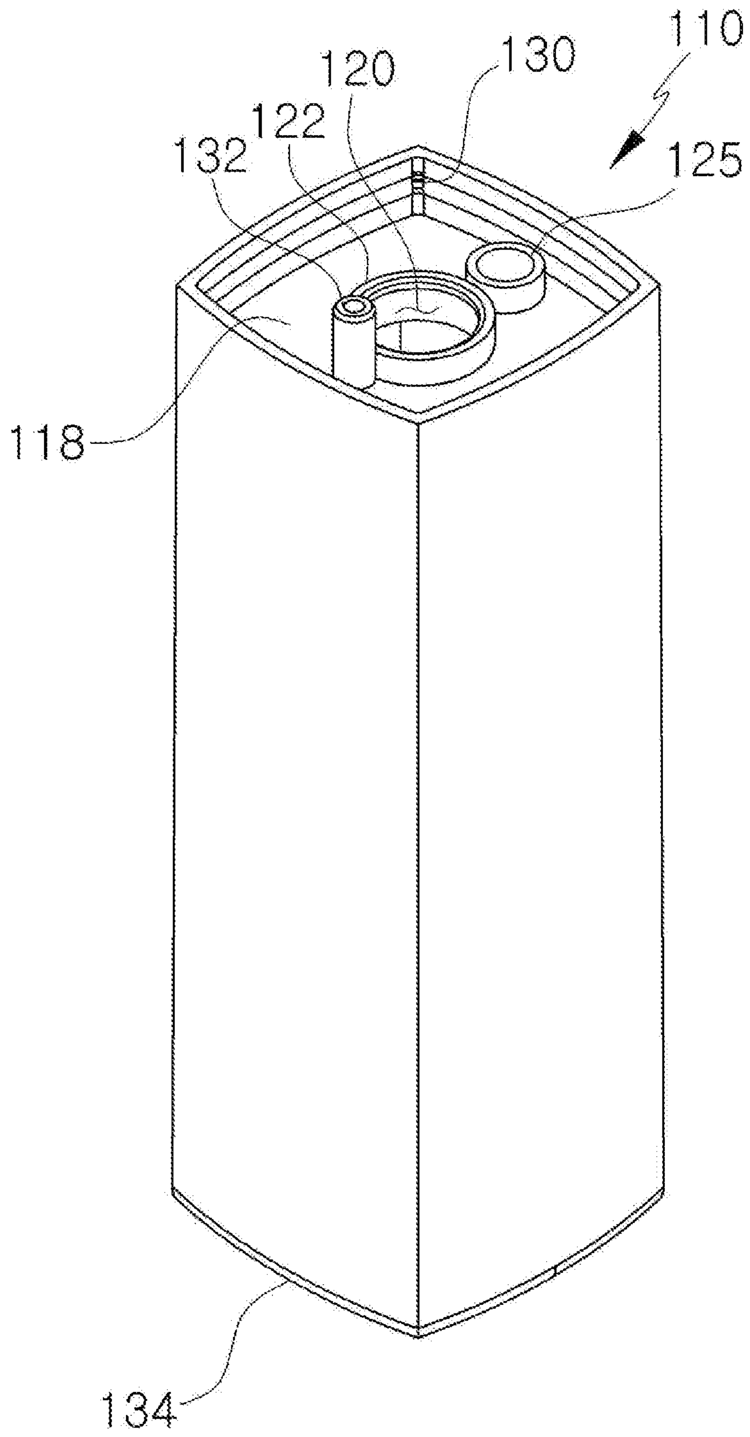
FIG. 4 and FIG. 5 are a perspective view and a central vertical cross-sectional view of the body in the container illustrated in FIG. 1.
Figure 5:
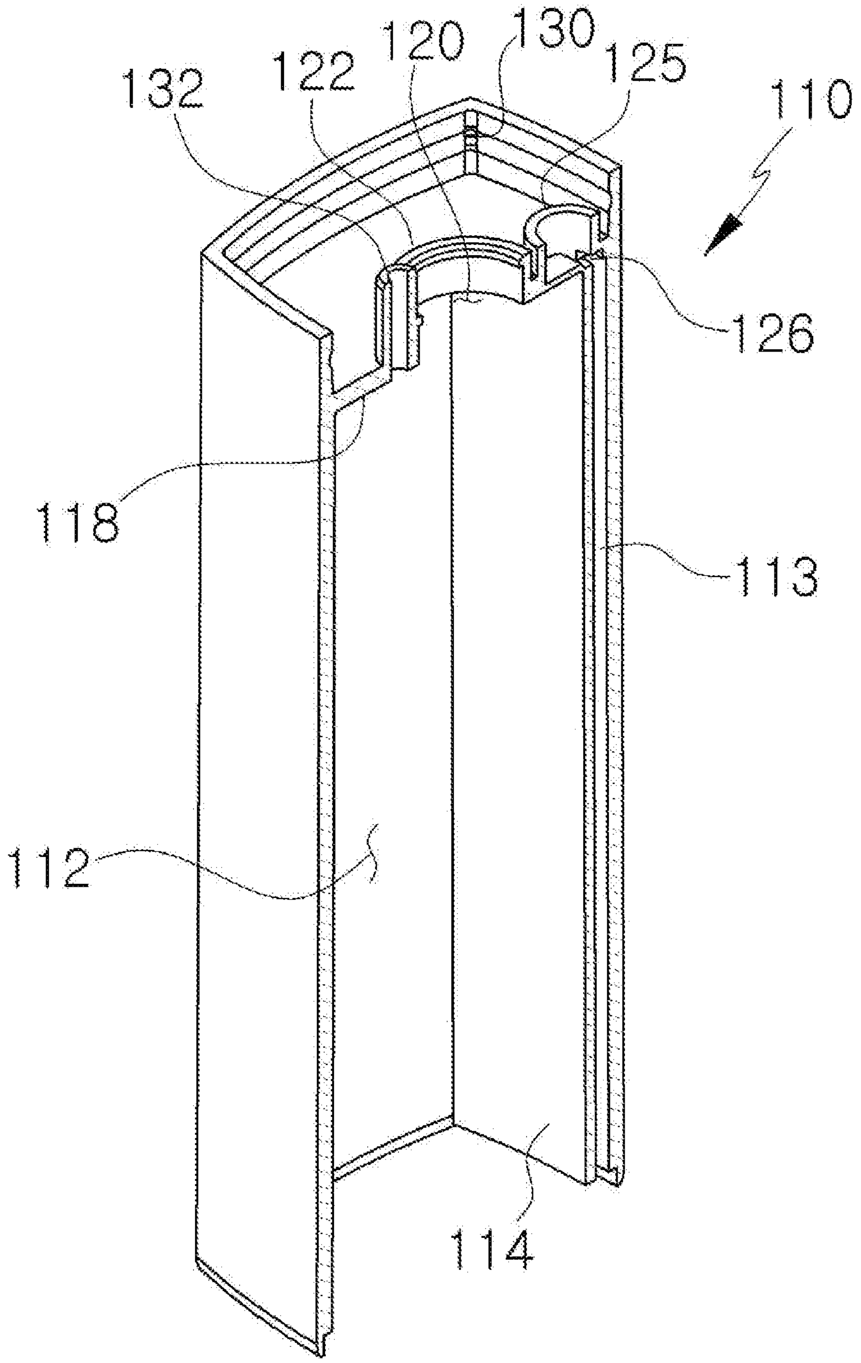
Figure 6:
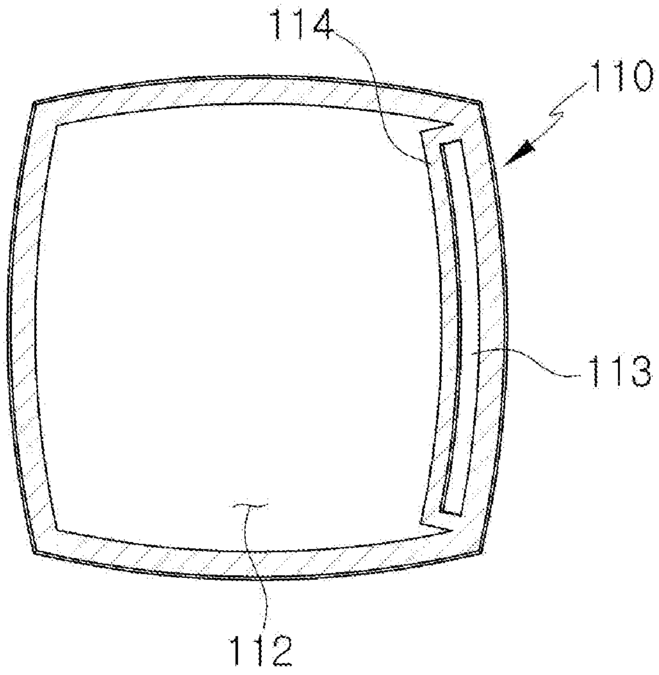
FIG. 6 is a horizontal cross-sectional view of the body.

FIG. 4, FIG. 5, and FIG. 6 are a perspective view, a perspective cross-sectional view (vertical cross-sectional view), and a horizontal cross-sectional view of the body 110 in the container 100 illustrated in FIG. 1.

While a container 100 based on this embodiment is illustrated as having a body of a rectangular shape, the present invention is not limited by the cross section of the body 110. Thus, in a container according to another embodiment of the invention, the body can have a circular shape, an elliptical shape, or a polygonal shape such as a triangular or pentagonal shape.

Referring to FIGS. 3 to 6, the body 110 may include a filling space 112 for storing the content, where the filling space 112 may be separated from a body outflow channel 113 by a partition 114. The partition 114 can be formed along the lengthwise direction of the body 110 and can be formed adjacent to at least one of the four sides within the body 110. A gap (no reference numeral assigned) may be formed between a lower end of the partition 114 and the base 134, and the content of the filling space 112 can flow into the body outflow channel 113 through said gap.

A hole (not shown) can be formed in the lower end of the partition 114 to provide communication between the filling space 112 and the body outflow channel 113.

The width of the partition 114 can be formed to sufficiently cover at least one of the four sides of the body 110. The partition 114 and the body 110 can be fabricated to have the same material and color, so that the partition 114 is not readily observed from the exterior.

The body outflow channel 113 may have a smaller cross-sectional area than the filling space 112 and may correspond to a channel through which the content may move upward. That is, the operation of the pump 230 can cause the content to flow under the partition 114 to enter the body outflow channel 113, move up, and flow through an upper body hole 126 and a cover channel 158 into the pump insertion space 154. In this way, the body outflow channel 113 may be included on one side of the body 110 to provide a channel through which the content can move.

A weight 140 can be inserted within the body outflow channel 113. The weight 140 can have a cross section that is the same in shape as the cross section of the body outflow channel 113 but somewhat reduced in size. As the weight 140 is inserted inside the body outflow channel 113, a narrow channel can be formed for the movement of the content.

Of course, in cases where the cross-sectional area of the body outflow channel 113 is sufficiently small, it would be possible to omit the insertion of the weight 140.

The body 110 can have a coupling plane 118 formed at the top and can be open at the bottom. A center hole 120 and a center protrusion 122 may be formed in the center of the coupling plane 118, and an air nozzle 132 and a body protrusion 125 may be formed next to the center hole 120 and center protrusion 122. The coupling plane 118 may be formed with a slight distance from the upper end of the body 110. As a result, the coupling plane 118 can create a concave shape at the upper portion of the body 110, and the body cover 150, pump support 170, and shoulder 200 can be sequentially inserted in the concave space.

The center hole 120 and center protrusion 122 may be formed in the center of the coupling plane 118. The center hole 120 may be formed on the inside of the center protrusion 122, and the pump insertion space 154 of the body cover 150 may be inserted within the center protrusion 122. The content may not be discharged through the center hole 120; rather, the center hole 120 can secure the position of the body cover 150 and couple the body cover 150 to the body 110.

The body protrusion 125 may be shaped as a hollow cylinder with an open top and a bottom partially closed by the coupling plane 118. In the portion of the coupling plane 118 inside the body protrusion 125, an upper body hole 126 may be formed. A channel protrusion 162 formed on a lower surface of the body cover 150 may be inserted in and placed in communication with the body protrusion 125. Thus, the body protrusion 125 may be a part that interconnects the upper body hole 126 and the cover channel 158, which correspond to channels provided for the flow of the content, and may have a particular interior space to form an enclosed flow channel and limit the volume of the flow channel to a particular amount.

At an upper portion of the body 110, a coupling groove 130 can be formed in the edge portions. A coupling protrusion 206 formed on the outer perimeter of the shoulder 200 may be inserted into the coupling groove 130, whereby the shoulder 200 may be coupled to an upper portion of the body 110.

The air nozzle 132 may be shaped as a hollow cylinder with its lower end communicating with the filling space 112. Outside air can flow into the filling space 112 through the air nozzle 132 to thereby prevent a decrease in pressure in the filling space 112 and keep the pressure at atmospheric pressure. The air nozzle 132 may be inserted into an air inflow hole 167 formed in the body cover 150, so that the upper end may be kept open.

Figure 7:
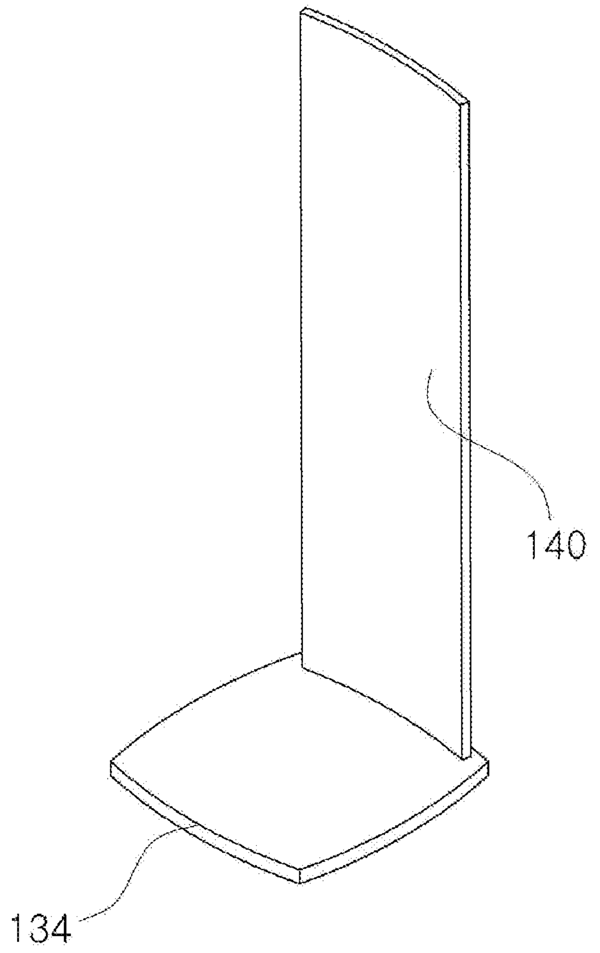
FIG. 7 is a perspective view illustrating the base and the weight.

FIG. 7 is a perspective view illustrating the base 134 and the weight 140.

Referring to FIG. 2 and FIG. 7, the base 134 can be coupled to the open bottom of the body 110. The base 134 can correspond to a thinly formed plate having the same cross section as that of the body 110. The base 134 can be fixedly coupled to the bottom of the body 110 by adhesion or fusion, etc. Also, the lower end of the weight 140 can be coupled to an upper surface of the base 134.

The weight 140 may have a cross section that is the same in shape as the body outflow channel 113 but somewhat smaller in size. Thus, the weight 140 may reduce the cross section of the body outflow channel 113 and thereby allow the content to pass through the body outflow channel 113 speedily. The weight 140 can be fabricated together with the base 134 as an integrated structure that is coupled onto the base 110.

Figure 8:
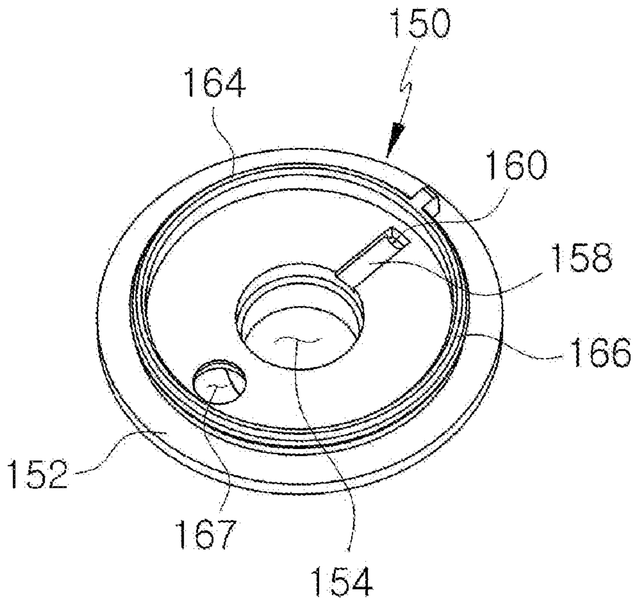
FIG. 8 and FIG. 9 are a perspective view and a cross-sectional view illustrating the body cover.
Figure 9:
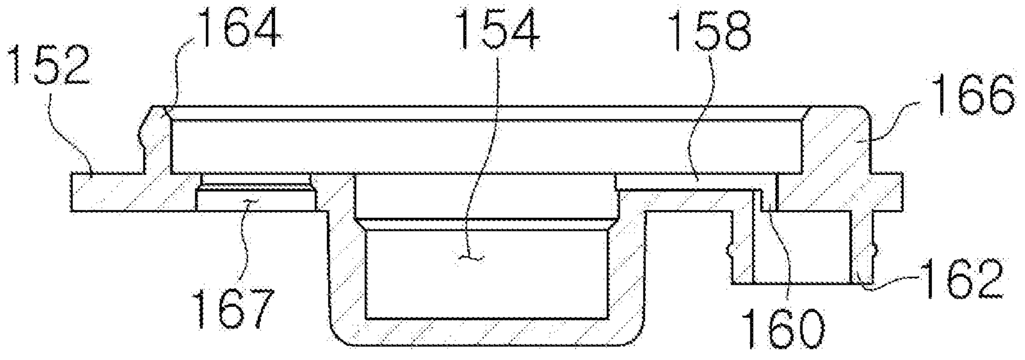

FIG. 8 and FIG. 9 are a perspective view and a perspective cross-sectional view illustrating the body cover 150.

Referring to FIGS. 2, 3, 8, and 9, the body cover 150 may be coupled to an upper portion of the body 110, and the pump support 170 and the shoulder 200 may be sequentially coupled to an upper portion of the body cover 150. The body cover 150 may include a cover plane 152, which has the same shape as the horizontal cross section of the body 110, and an upper peripheral element 164, which protrudes upward from a surface of the cover plane 152 and has an annular shape with an open top. On the inside of the upper peripheral element 164, there may be provided a pump insertion space 154, a cover channel 158, and an air inflow hole 167. On the lower surface of the cover plane 152, there may be a channel protrusion 162 protruding downward.

The pump insertion space 154 may be a cavity formed concavely in the center of the cover plane 152 and may have a horizontal cross section of a circular shape. The housing 232 of the pump 230 may be inserted in the pump insertion space 154. A hole (no reference numeral assigned) may be formed in the lower surface of the housing 232, and the content that is drawn into the pump insertion space 154 may pass through the hole in the lower surface of the housing 232 to flow into the housing 232.

The pump insertion space 154 may protrude downward from the cover plane 152, and this portion may be inserted in the center protrusion 122 of the body 110.

One side of an upper portion of the pump insertion space 154 may communicate with the cover channel 158. Therefore, the content that flows in through the cover channel 158 may move down to the bottom surface of the pump insertion space 154 and into the interior of the housing 232.

A cover channel 158 having a constant width and depth may be formed horizontally in the cover plane 152. The cover channel 158 can have a cross section shaped as a quadrilateral, with one end communicating with a cover inflow hole 160 and the other end communicating with the pump insertion space 154. The cover channel 158 may be defined by a bottom surface and two side surfaces, and its open top may be closed by the pump support 170.

The cover inflow hole 160 formed at one end of the cover channel 158 may be formed penetrating through the cover plane 152 and may communicate with the interior space of the channel protrusion 162.

The channel protrusion 162, formed protruding from the lower surface of the cover plane 152, may be shaped as a hollow cylinder and may be open at the lower end. The upper end of the channel protrusion 162 may be closed by the cover plane 152, communicating with the cover channel 158 only through the cover inflow hole 160. The channel protrusion 162 may be inserted into the body protrusion 125 formed on the upper portion of the body 110.

A coupling protrusion 166 may be formed on the outer perimeter of the upper peripheral element 164. When the pump support 170 is coupled to an upper portion of the body cover 150, the upper peripheral element 164 may be inserted into the coupling groove 176 formed between the outer peripheral element 172 and the inner peripheral element 174 of the pump support 170, at which time the coupling protrusion 166 can be inserted into a groove (no reference numeral assigned) formed in the inner perimeter of the outer peripheral element 172.

An air inflow hole 167 having the shape of a hollow cylinder may be formed on the inside of the upper peripheral element 164. The air nozzle 132 of the body 110 may be inserted into the air inflow hole 167. The open upper end of the air nozzle 132 can allow air to enter the interior of the filling space 112 of the body 110.

Figure 10:
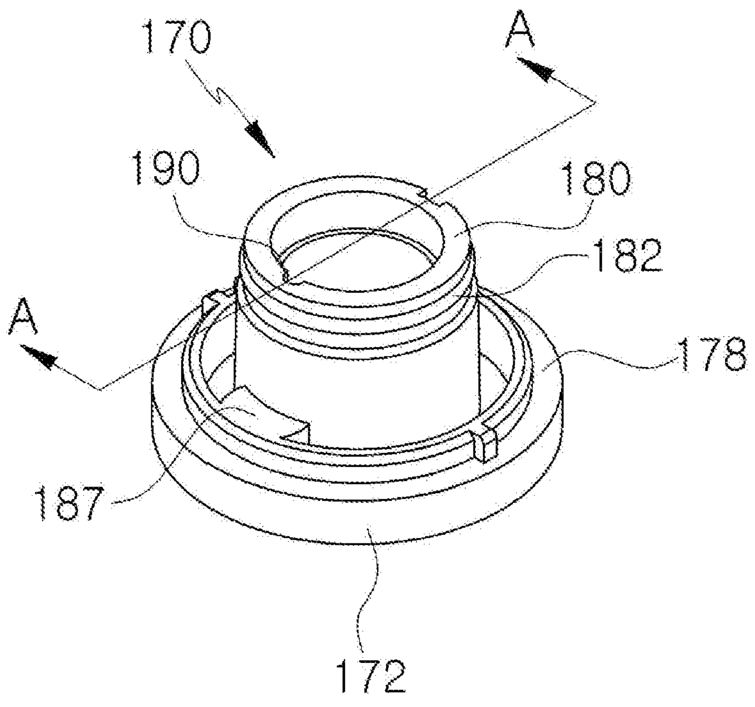
FIG. 10 and FIG. 11 are a perspective view and a cross-sectional view illustrating the pump support.
Figure 11:
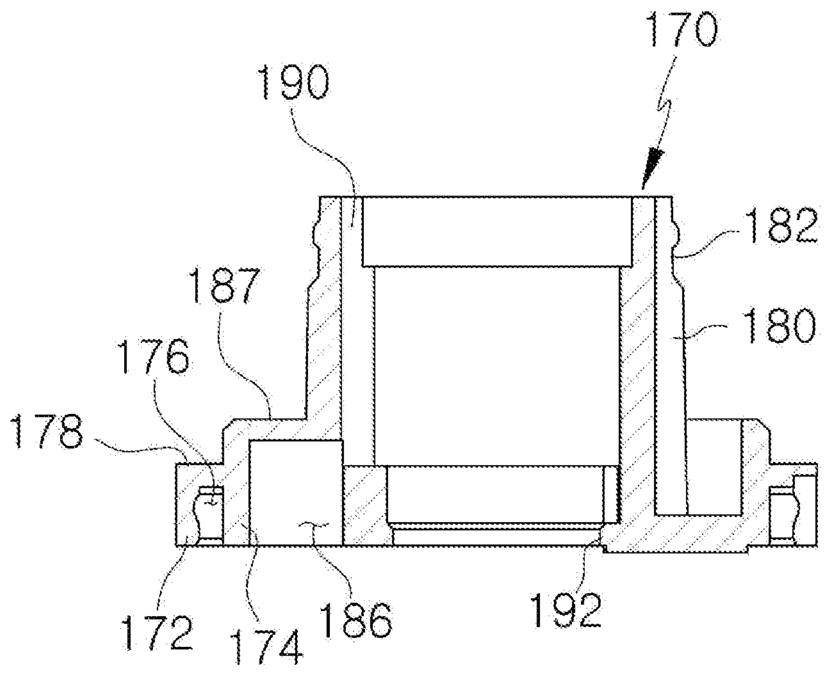

FIG. 10 and FIG. 11 are a perspective view and a perspective cross-sectional view illustrating the pump support 170.

Referring to FIGS. 2, 3, 10, and 11, the pump support 170 may be coupled to an upper portion of the body cover 150 to stably support the pump 230 and prevent outside air from entering the inside of the pump insertion space 154. The pump support 170 may include a support body 180 shaped as a hollow cylinder in the center as well as an outer peripheral element 172 and an inner peripheral element 174 formed around the support body 180.

The outer peripheral element 172 and the inner peripheral element 174 may each have a quadrilateral horizontal cross section and may form a coupling groove 176 therebetween, which corresponds to the gap between the outer peripheral element 172 and the inner peripheral element 174. The upper peripheral element 164 of the body cover 150 may be inserted in the coupling groove 176 by way of press fitting. A mount ledge 178 may be formed on an upper portion of the outer peripheral element 172, where the upper surface of the mount ledge 178 may be pressed down by a pressing protrusion 208 provided on the inside of the shoulder 200.

The support body 180 may be located on the inside of the inner peripheral element 174 and may have a greater height compared to the inner peripheral element 174. A body detent groove 182 may be formed in the outer perimeter of the support body 180, and inner coupling protrusions 212 formed on the inside of the shoulder 200 may be inserted into the body coupling groove 182. The body detent groove 182 and inner coupling protrusions 212 allow a stable coupling of the shoulder 200 onto the pump support 170.

The housing 232 of the pump 230 may be inserted in the hollow space within the support body 180. Also, a contact protrusion 192 having an annular shape may be formed on the inner perimeter at a lower portion of the support body 180. The contact protrusion 192 may press against and tightly contact the outer perimeter of the housing 232 of the pump 230, to thereby prevent outside air from entering the interior of the pump insertion space 154.

A support air groove 190 may be formed in the inner perimeter of the support body 180, starting from the upper end and extending to a particular length. A particular gap may be formed between the support air groove 190 and the housing 232 of the pump 230, and air may flow through this gap to the upper end of the air nozzle 132 of the body 110.

A hollow space may be formed in an annular shape between the inner peripheral element 174 and the support body 180, and a support insertion cavity 186 having an upper surface 187 may be formed in this space. The support insertion cavity 186 may correspond to an empty space that is closed at the top by the upper surface 187 and open at the bottom.

The air nozzle 132 formed on the body 110 may be inserted in the support insertion cavity 186. As the upper end of the air nozzle 132 may not be in contact with the upper surface 187, a channel may be formed therebetween that allows a movement of air.

A packing 260 having an annular shape can be provided at an end portion of the support body 180 of the pump support 170. The packing 260 may be placed around the housing 232 of the pump 230, to be located under the flange 233.

Figure 12:
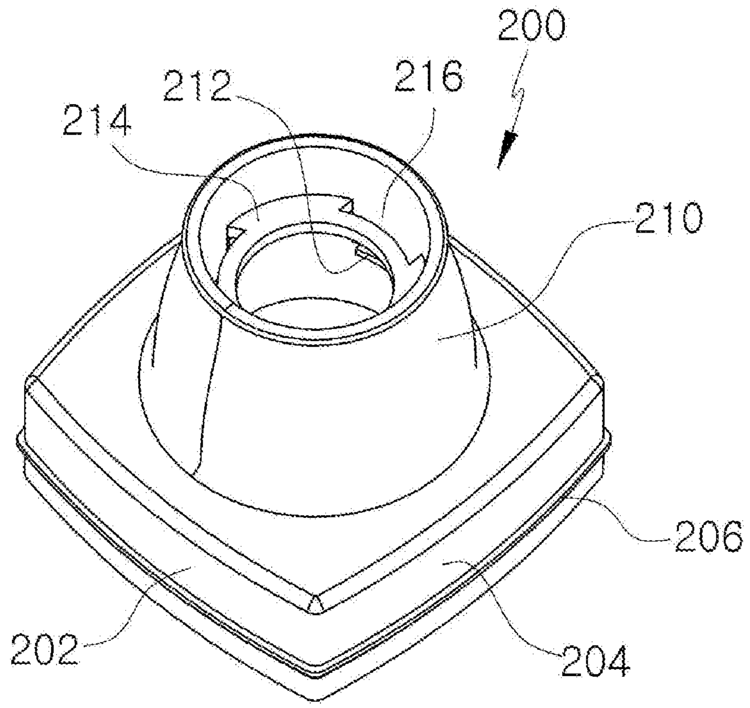
FIG. 12 and FIG. 13 are a perspective view and a perspective cross-sectional view illustrating the shoulder.
Figure 13:
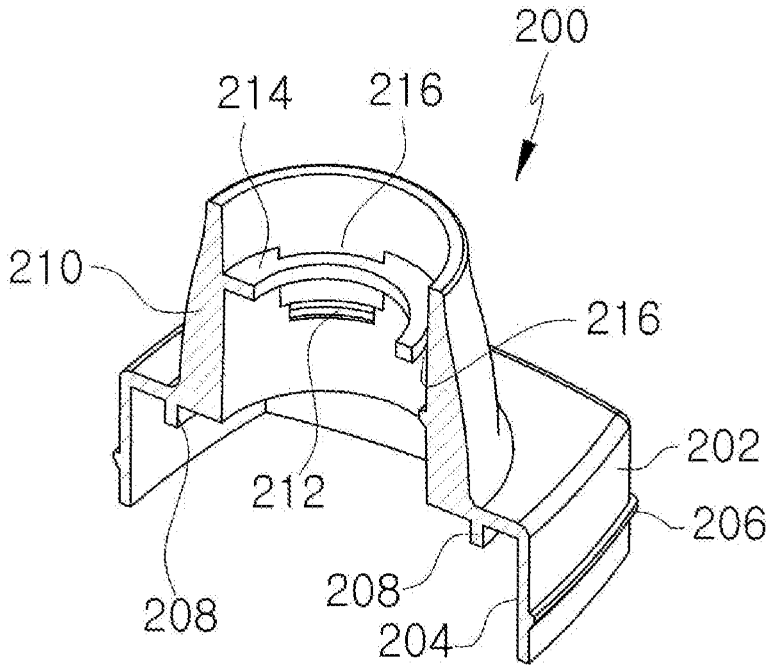

FIG. 12 and FIG. 13 are a perspective view and a perspective cross-sectional view illustrating the shoulder 200.

Referring to FIGS. 2, 3, 12, and 13, the shoulder 200 may be coupled onto an upper portion of the pump support 170 to press down on the pump 230, and the nozzle cap 220 may be coupled to an upper portion of the shoulder 200. The shoulder 200 may be composed of a pump-coupling part 210, which may be shaped as a hollow cylinder, and a body-coupling part 202, which may be formed around the pump-coupling part 210 and may be open at the bottom only.

The body-coupling part 202 may include a coupling peripheral element 204, which may be inserted into the recessed portion formed by the coupling plane 118 at the upper portion of the body 110 as described above. Since the body-coupling part 202 is open at the bottom, the body cover 150 and the pump support 170 may be housed therein.

The body-coupling part 202 may include an upper surface (no reference numeral assigned), where the upper surface can have the same shape as the horizontal cross section of the body 110. At the center of the upper surface, the pump-coupling part 210 may be formed in a protruding manner. Also, from the upper surface, a pressing protrusion 208 may be formed protruding downward on the inside of the body-coupling part 202. The pressing protrusion 208 may press down on the mount ledge 178 of the pump support 170, whereby the pump support 170 and the pump 230 may be coupled to the body 110 in a stable manner.

The pump-coupling part 210 may be shaped as a hollow cylinder and may be open at both the upper end and the lower end. The pump 230 and the support body 180 may be inserted within the pump-coupling part 210. The lower end of the pump-coupling part 210 may communicate with the interior space of the body-coupling part 202.

A detent protrusion 214 having an annular shape may be formed protruding inward on the inside of the pump-coupling part 210. The detent protrusion 214 may include shoulder air holes 216 that are partially cut away. The detent protrusion 214 may press down on a flange 233 formed around the housing 232 of the pump 230, so that the pump 230 may be secured to the pump insertion space 154 in a stable manner. As illustrated in FIG. 2 and FIG. 3, the flange 233 may not be in contact with the upper end of the support body 180 of the pump support 170 and may be separated by a particular gap. This gap may allow air from outside the container 100 to flow through the shoulder air holes 216, support air groove 190, and air nozzle 132 to the inside of the filling space 112.

The shoulder air holes 216 may correspond to arc-shaped holes that are formed as portions of the detent protrusion 214 are cut away. The inner coupling protrusions 212 may protrude from a location below the shoulder air holes 216.

A multiple number of inner coupling protrusions 212 may be formed on the inner perimeter of the pump-coupling part 210 in a particular interval. The inner coupling protrusions 212 may be inserted in the detent groove 182 formed in the outer perimeter of the support body 180.

Figure 14:
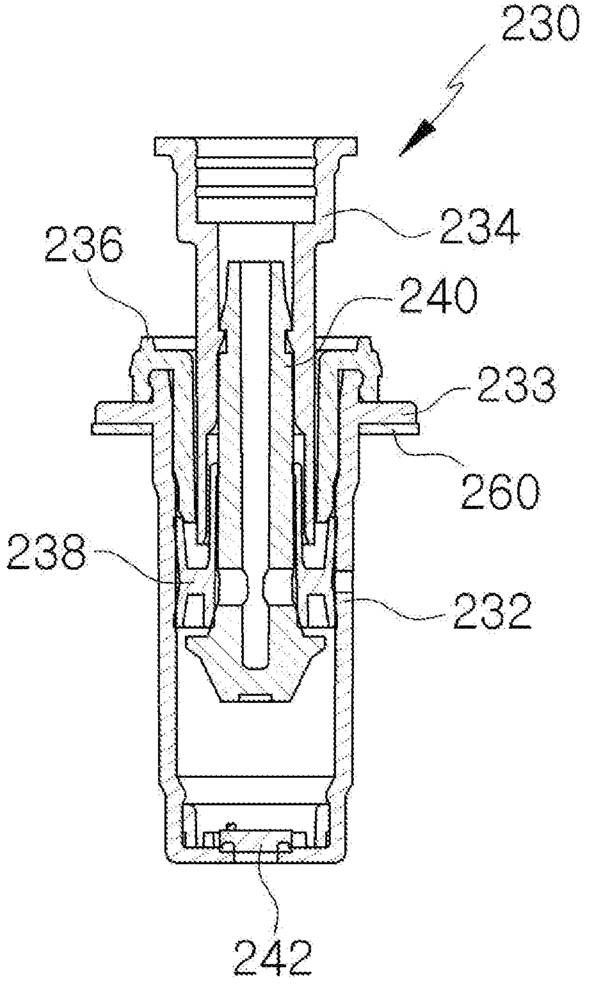
FIG. 14 is a cross-sectional view illustrating the pump.

FIG. 14 is a cross-sectional view of the pump 230.

Referring to FIG. 14, the pump 230 may include a housing 232, a valve 234, a housing cap 236, a piston 238, a guide 240, and a disk 242, but as these are the same as or similar to the components of the pump structure disclosed in Korean Registered Patent No. 1963619, they will not be described here in further detail.

Referring to FIG. 2 and FIG. 3, due to the suctioning force of the pump 230, the content in the filling space 112 may flow through the channel formed at the lower portion of the partition 114 to enter the body outflow channel 113 and may then move up and be discharged out of the body outflow channel 113 through the upper body hole 126. After being discharged through the upper body hole 126, the content may enter the inside of the channel protrusion 162 and may flow through the cover inflow hole 160 and the cover channel 158 to enter the inside of the pump insertion space 154. In the pump insertion space 154, the suctioning force of the pump 230 may force the content to move into the housing 232 and be discharged through the nozzle 222 provided in the nozzle cap 220 to the outside of the container 100.

Thus, a container 100 based on this embodiment need not include a hose for suctioning the content inside the body 110, so that not only can the container 100 have a simple structure, but also the problem of the aesthetic of the container 100 being degraded by the hose can be resolved.

As the content is drawn by the pump 230 from within the filling space 112, the pressure within the filling space 112 can be decreased. As such pressure decrease inside the filling space 112 causes a decrease also in the suctioning force of the pump 230, it is necessary to maintain the pressure in the filling space 112 at a particular level (for example, at atmospheric pressure).

In a container 100 based on this embodiment, air from the outside may enter the inside of the pump-coupling part 210 by flowing through a gap (no reference numeral assigned) formed between the nozzle cap 220 and the inner perimeter of the pump-coupling part 210. The air that has entered the pump-coupling part 210 may flow through the shoulder air holes 216, support air groove 190, and air nozzle 132 and into the filling space 112. As the outside air thus enters the inside of the filling space 112 and maintains atmospheric pressure, the suctioning force of the pump 230 can also be kept at a constant level.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

The invention claimed is:

1. A container for spraying liquid, the container comprising:

a body including a filling space and a body outflow channel, the body outflow channel having a smaller cross-sectional area compared to the filling space due to a partition provided along a lengthwise direction, wherein a content injected into the filling space enters the body outflow channel at a lower portion of the partition, and an upper body hole is formed at an upper portion of the partition as an exit from the body outflow channel;

a body cover coupled to an upper portion of the body, the body cover comprising a cover channel and a pump insertion space, the cover channel communicating with the upper body hole, the pump insertion space communicating with the cover channel;

a pump inserted in the pump insertion space for dispensing the content;

a pump support coupled to an upper portion of the body cover and configured to support the pump; and a shoulder coupled to an upper portion of the pump support and configured to press the pump support and the pump downward in a direction towards the body, wherein the shoulder comprises a detent protrusion configured to press the pump downward, a shoulder air hole is formed in the detent protrusion, a support air groove communicating with the shoulder air hole is formed in the pump support, an air nozzle communicating with the support air groove is formed in the body, and the air nozzle is in communication with the filling space.

2. The container for spraying liquid according to claim 1, wherein the body has a cross section of a quadrilateral shape.

3. The container for spraying liquid according to claim 1, wherein a weight is inserted inside the body outflow channel to reduce the cross-sectional area of the body outflow channel.

4. The container for spraying liquid according to claim 1, wherein a coupling plane is provided at an upper portion of the body, the upper body hole is formed in the coupling plane, a center hole is formed in the coupling plane, the center hole being configured to receive the pump insertion space, and a body protrusion is formed on one side of the center hole such that the upper body hole is positioned on an inside of the body protrusion.

5. The container for spraying liquid according to claim 4, wherein the body cover comprises a channel protrusion, the channel protrusion configured to be inserted to the inside of the body protrusion and configured to communicate with the cover channel.

6. The container for spraying liquid according to claim 1, wherein the pump support comprises a contact protrusion, the contact protrusion configured to contact a periphery of the pump.

7. The container for spraying liquid according to claim 1, wherein the body cover comprises an air inflow hole configured to receive the air nozzle.

8. The container for spraying liquid according to claim 1, wherein a base is coupled to a lower portion of the body.

9. The container for spraying liquid according to claim 8, wherein the base is formed together with a weight as an integrated structure.

* * * * *